(12) United States Patent
Hadji et al.

(10) Patent No.: US 12,321,964 B2
(45) Date of Patent: *Jun. 3, 2025

(54) METHOD AND SYSTEM FOR EXEMPLARY CAMPAIGN MESSAGE MANAGEMENT

(71) Applicant: Klaviyo Inc., Boston, MA (US)

(72) Inventors: Sofiane Hadji, Boston, MA (US); Gal Korcia, Boston, MA (US); Charlie Natoli, Boston, MA (US); Vinicius Aurichio, Boston, MA (US); Andrew Piliero, Boston, MA (US); Devin Patel, Boston, MA (US)

(73) Assignee: Klaviyo Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,821

(22) Filed: Sep. 26, 2023

(65) Prior Publication Data
US 2024/0037607 A1 Feb. 1, 2024

Related U.S. Application Data

(63) Continuation of application No. 17/974,530, filed on Oct. 27, 2022, now Pat. No. 11,810,157.

(60) Provisional application No. 63/393,914, filed on Jul. 31, 2022.

(51) Int. Cl.
*G06Q 30/0241* (2023.01)
*G06Q 30/0242* (2023.01)
*G06Q 30/0251* (2023.01)

(52) U.S. Cl.
CPC ..... *G06Q 30/0276* (2013.01); *G06Q 30/0243* (2013.01); *G06Q 30/0244* (2013.01); *G06Q 30/0267* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 6,845,273 | B1 | 1/2005 | Taylor |
| 8,364,467 | B1 | 10/2013 | Bowman et al. |
| 9,645,710 | B2 | 5/2017 | Coe |
| 10,803,479 | B2 | 10/2020 | Brigham et al. |
| 11,195,201 | B1 | 12/2021 | Li |
| 11,301,632 | B2 | 4/2022 | Terry et al. |

(Continued)

OTHER PUBLICATIONS

G. Campaign Monitor, "10 Examples of Using Email for Lifecycle Marketing", retrieved from httsp://www.campaignmonitor.com/blog/email-marketing/10-examples-using-email-for-lifecycle-marketingl, available on June 25, 2019 (Year: 2019)*

(Continued)

*Primary Examiner* — Sam Refai
(74) *Attorney, Agent, or Firm* — Batt IP A Law Corporation; Richard Batt

(57) ABSTRACT

Methods and systems for improved and efficient campaign message management are disclosed. Via an automated process, the system can generate, classify and sort a browsable collection of diverse, high-performing campaign messages, e.g., emails and SMS messages. Such messages can prompt a prospective campaign generator to create quality content for his/her own campaigns. Furthermore, varied and relevant exemplary campaigns can be shown to different users in response to his/her unique needs or expressed interests.

18 Claims, 14 Drawing Sheets

(56) References Cited

U.S. PATENT DOCUMENTS

| | | | |
|---|---|---|---|
| 11,316,808 B1 | 4/2022 | Eidelman et al. | |
| 11,392,847 B1 | 7/2022 | Abdollahian et al. | |
| 2008/0040175 A1 | 2/2008 | Dellovo | |
| 2011/0055012 A1* | 3/2011 | Christianson | G06Q 30/0255 |
| | | | 701/408 |
| 2011/0246201 A1* | 10/2011 | Hawit | H04M 3/4878 |
| | | | 704/260 |
| 2012/0245925 A1 | 9/2012 | Guha et al. | |
| 2014/0279745 A1 | 9/2014 | Esponda et al. | |
| 2015/0006295 A1 | 1/2015 | Liu et al. | |
| 2015/0066654 A1 | 3/2015 | Kannan et al. | |
| 2016/0162456 A1 | 6/2016 | Munro et al. | |
| 2016/0210003 A1* | 7/2016 | Coe | G06F 3/0482 |
| 2016/0217500 A1* | 7/2016 | Brigham | G06Q 30/0276 |
| 2018/0114253 A1* | 4/2018 | Kakarlapudi | G06Q 30/0276 |
| 2018/0373696 A1* | 12/2018 | Terry | G06N 5/02 |
| 2021/0375262 A1 | 12/2021 | Wick et al. | |

OTHER PUBLICATIONS

Dewey Decimal Classification, Encyclopedia Britannica, from https://www.britannica.com/science/Dewey-Decimal-Classification (Year 2023).

Mumford, Tracy, Remember card catalogs?, MPR News, dated Mar. 10, 2015.

Niesler, T. R., et al., A variable-length category-based n-gram language model, 1996 IEEE International Conference on Acoustics, Speech, and Signal Processing Conference Proceedings, Aug. 6, 2002.

Joshi, Prateek, spacCy Tutorial to Learn and Master Natural Language Processing (NLP), retrieved Apr. 26, 2023 from Analytics Vidhya.

Kotsiantis et al., Machine learning: A review of classification and combining techniques, Artificial Intelligence Review, Nov. 2006, 26(3): 159-190, DOI: 10. 1007/s10462-007-9052-3, retrieved online on Oct. 16, 2023 (Year: 2006).

10 Examples of Using Email for Lifecycle Marketing; Campaign Monitor, Jun. 25, 2019.

NPL. U.S. Appl. No. 17/974,530. Reply to Non-final Office Action Aug. 18, 2023.

NPL. U.S. Appl. No. 17/939,985, filed Jul. 30, 2023. Applicant Reply.

NPL. U.S. Appl. No. 17/939,985, filed May 10, 2024, Final Office Action.

NPL. U.S. Appl. No. 17/974,530. Notice of Allowance Sep. 20, 2023.

* cited by examiner

370

318
| | |
|---|---|
| Type | Link |
| Width | w |
| Height | x |
| Top | y |
| Left | z |
| Visible | True |
| Text | BLAVIC |

320
| | |
|---|---|
| Type | Image |
| Width | w |
| Height | x |
| Top | y |
| Left | z |
| Visible | True |
| Text | HAPPY NEW YEAR |

322
| | |
|---|---|
| Type | Text |
| Width | w |
| Height | x |
| Top | y |
| Left | z |
| Visible | True |
| Text | Ship Free |

*FIG. 3C*

METHOD AND SYSTEM FOR EXEMPLARY CAMPAIGN MESSAGE MANAGEMENT

CROSS-REFERENCES TO RELATED APPLICATIONS

This application is a continuation of U.S. patent application Ser. No. 17/974,530, filed Oct. 27, 2022, which claims the benefit of U.S. Provisional Patent Application No. 63/393,914, entitled "METHOD AND SYSTEM FOR EXEMPLARY CAMPAIGN MESSAGE CLASSIFICATION, GENERATION AND MANAGEMENT," filed Jul. 31, 2022, which are incorporated herein by reference for all purposes.

TECHNICAL FIELD

The present subject matter relates to systems and methods for data integration and management of electronic messages. More specifically, the present subject matter relates to data management in the context of computer-aided management of electronic messages.

BACKGROUND

Digital marketing campaign has become a powerful way to promote a business's products and services to its customers. It helps the customers to be aware of the business's latest offerings. Among digital marketing's various tools, computer-compiled campaign messages such as emails and mobile text messages can directly deliver the most relevant content to a customer.

Various providers have used message examples to motivate business marketers, such as ReallyGoodEmails or Milled. However, their selections of message examples are limited. For example, some examples are selected based on manual reviews and voluntary user submissions, which are time consuming and low-efficient; some examples lack a standardized selection process with quality control. In addition, these existing example providers do not provide insights into the performance of these message examples. Furthermore, these examples often are not diverse enough to offer a tailored experience for a specific business marketer.

As such, there are a lot of areas for improving the computing system performance in the classification, generation, and management of campaign messages via an improved approach.

SUMMARY OF THE INVENTION

The present subject matter describes improved methods for automated campaign message management via a computer network. Via an automated process, the system can generate a browsable collection of diverse, relevant, high-performing campaign messages, e.g., emails and SMS messages, which can prompt a prospective campaign generator to create quality content for his/her own campaigns. Furthermore, various relevant campaigns can be shown to users in response to his/her unique needs or expressed interests, e.g., via applying a number of filters to further modify the browsable campaign messages.

According to some embodiments, the system can sort various campaign messages based on a number of characteristic tags and predetermined diversity preference rules. According to some embodiments, the sorted exemplary campaign messages can be automatically resorted or updated at a predetermined interval, e.g., every 24 hours.

According to some embodiments, when there are two or more lists of sorted campaign messages, they system can maintain them separately and only generate a merged runtime list at the time of displaying. As such, the system can showcase the freshly sorted and dynamically rendered campaign messages to a campaign generator.

According to some embodiments, the system can determine a campaign message's characteristic tags via an ensemble model with diverse base models, such as a logic-rule model and/or one or more language models. The ensemble model can process the content data, layout data and metadata to predict a message's characteristic tags based on an aggregated prediction result. For example, the system can predict a campaign message's type via the ensemble model.

A computer implemented-method of the present subject matter comprises: receiving, at a campaign management server, exemplary campaign messages, wherein the exemplary campaign messages comprise email messages and text messages in a first order, receiving one or more characteristic tags associated with each of the exemplary campaign messages, sorting the exemplary campaign messages based on the one or more characteristic tags and one or more predetermined diversity preference rules to generate a respective list of sorted exemplary email messages and sorted exemplary text messages in a second order, and displaying the respective list of exemplary email messages and exemplary text messages to a prospective campaign generator based on the respective list of sorted exemplary email messages and sorted exemplary text messages. Furthermore, the first order is chronological order, and the second order is non-chronological order.

According to some embodiments, the computer-implemented method further comprises receiving one or more selected characteristic tags from a prospective campaign generator, removing one or more exemplary campaign messages based on the one or more selected characteristic tags to generate a respective updated list of email messages and text messages, and merging the respective updated list of email messages and text messages to form a runtime list of sorted exemplary email messages and sorted exemplary text messages.

According to some embodiments, the computer-implemented method further comprises determining, for each of the exemplary campaign messages, one of the one or more characteristic tags based on a plurality of message components with content data and layout data using a respective classification model. According to some embodiments, the respective classification model can be an ensemble model comprising a number of base models configured to independently generate a characteristic tag.

According to some embodiments, sorting the exemplary campaign messages further comprises dividing, iteratively, the exemplary campaign messages into a plurality of sub-groups based on the at least one of the characteristic tags, and merging, iteratively, the plurality of sub-groups based on the one or more predetermined diversity preference rules to generate the respective list of sorted email messages and sorted text messages. According to some embodiments, such characteristic tags can comprise one or more of a marketing channel tag, a quality-design tag and a holiday tag, According to some embodiments, the one or more characteristic tags can comprise at least one of a marketing channel tag, a quality-design tag and a holiday tag. Other characteristic tags, such as a campaign type tag, a discount code tag and an industry type tag, can also be adopted by the system. These characteristic tags can either be automatically assigned by classification models or be manually assigned by a curator.

According to some embodiments, the computer-implemented method further comprises assigning a holiday tag to one or more of the exemplary campaign messages. A campaign message can correspond to an upcoming holiday if its theme is related to a holiday or holiday season within a predetermined amount of time, e.g., 60 days or 75 days, from the calculating day. As such, the holiday tag can be dynamically updated based on the calculating day.

Another computer implemented-method of the present subject matter comprises receiving, at a campaign management server, exemplary campaign messages in a first order, receiving one or more characteristic tags associated with each of the exemplary campaign messages, assigning one or more predetermined diversity preference rules associated with the exemplary campaign messages, sorting the exemplary campaign messages based on the one or more characteristic tags and the one or more predetermined diversity preference rules to generate a list of sorted exemplary campaign messages in a second order, and displaying the list of sorted exemplary campaign messages to a prospective campaign generator.

According to some embodiments, the computer-implemented method further comprises re-sorting, at a predetermined interval, the exemplary email messages based on the characteristic tags and the predetermined diversity preference rules to generate an updated list of sorted exemplary email messages.

A computer implementation of the present subject matter comprises: receiving, at a campaign management server, a campaign message, retrieving metadata associated with the campaign message, generating a plurality of message components with respective content data and layout data, and determining a first campaign type based on the plurality of message components and the metadata using a logic-rule model, determining a second campaign type based on the plurality of message components and the metadata using a first language model, determining a third campaign type based on the plurality of message components and the metadata using a second language model, and selecting a campaign type from the first, second and third campaign types based on a majority prediction. According to some embodiments, the metadata comprises at least one subject line and the campaign name of the campaign message.

Furthermore, the method can further comprise: generating, using a scraper model and an extraction model, the respective layout data and content data of the message components during a scraping and preprocessing process. In particular, the scraper model can extract size, location and visibility data of the message components to generate the layout data, and the extraction model can extract texts to generate the content data.

According to some embodiments, the logic-rule model can determine the first campaign type based on a number of predetermined logic rules, and the logic-rule model can further comprise a data labeling model, e.g., the snorkel model, to assign respective weights to the predetermined logic rules.

According to some embodiments, the first language model is a transformer encoder model, and the second language model is a N-gram model. According to some embodiments, the method can further comprise: converting the message components and the metadata into a series of textual representations and conducting feature extraction based on the series of textual representations to generate feature vectors using the transformer encoder model and the N-gram model, which can be further associated with a classifier model such as a Support Vector Machine model for determining the second campaign type and the third campaign type.

According to some embodiments, the method can further comprise: when each of the first campaign type, the second campaign type, and the third campaign type is different from each other, selecting a default model from the logic-rule model, the first language model and the second language model and selecting the campaign type from the default model for the campaign message. According to some embodiments, when each of the predicted campaign type is different, the system can abstain from selecting a majority campaign type.

According to some embodiments, the method can further comprise: selecting, for each of a number of campaign types, campaign messages associated with performance metrics higher than a predetermined threshold, and displaying the campaign messages to a prospective campaign generator.

Another computer implementation of the present subject matter comprises: receiving, at a campaign management server, a campaign message, retrieving metadata associated with the campaign message, wherein the metadata comprises at least one subject line and campaign name of the campaign message, generating a plurality of message components with respective content data and layout data, and determining a majority campaign type based on the plurality of message components and the metadata using an ensemble model, wherein the ensemble model comprises one or more of a logic-rule model, a first language model, and a second language model configured to independently generate a respective campaign type.

According to some embodiments, the method can further comprise generating, using a scraper model and an extraction model, the respective layout data and content data of the message components. The scraper model can extract size, location and visibility data of the plurality of message components to generate the layout data, and the extraction model is configured to extract texts to generate the content data.

According to some embodiments, the method can further comprise determining that the ensemble model does not produce the majority campaign type, and selecting a default model for generating the majority campaign type.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 3C shows exemplary content data and layout data in accordance with FIGS. 3A and 3B, according to one or more embodiments of the present subject matter;

DETAILED DESCRIPTION

The present subject matter pertains to improved approaches for a campaign message system. Embodiments of the present subject matter are discussed below with reference to FIGS. 1-10.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for efficiently generating, classifying and managing campaign messages with diversity and relevance from a large number of available messages. These can be implemented with computers that execute software instructions stored on non-transitory computer-readable media. An improved campaign message system can have one or more of the features described below.

Figure 1:
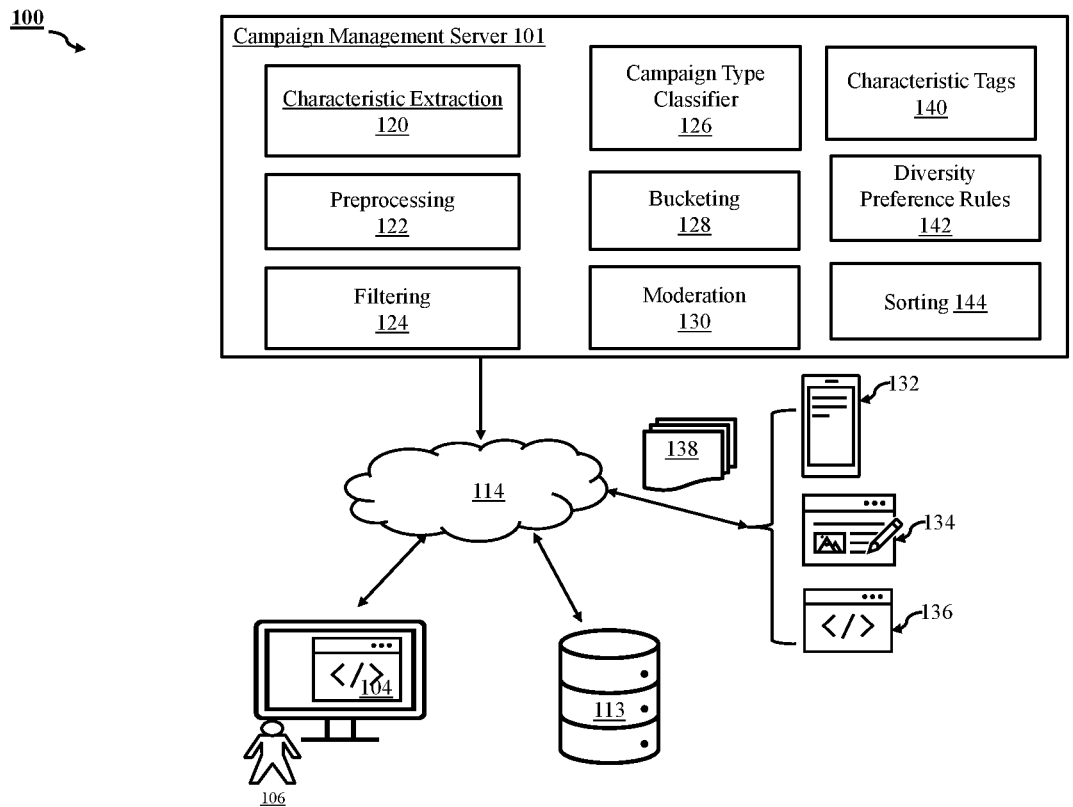
FIG. 1 shows an exemplary diagram of a campaign management system for exemplary campaign message generation, classification and management, according to one or more embodiments of the present subject matter.

FIG. 1 shows an exemplary diagram of a campaign message system 100 for efficiently managing high-performing and diverse campaign messages according to the present subject matter. A campaign message can be any computer-compiled electronic messages such as emails and Short Message Service (SMS) messages that can deliver relevant content to its targeted customers by a marketer or campaign generator. In addition, a campaign message can be other computer-compiled electronic communications such as videos or Twitter messages.

Campaign management server 101 can comprise a number of modules or units to implement functions of the present subject matter. According to some embodiments, campaign management server 101 can implement functions related to message characteristics extraction 120, preprocessing 122, filtering 124, campaign type classification 126, bucketing 128, moderation 130, characteristic tags 140, diversity rules 142 and sorting 144. Other relevant functions, such as consent flow initiation, can also be implemented by campaign management server 101.

As shown in FIG. 1, campaign management server 101 can receive a large number of previous campaign messages 138 from its numerous campaign generators. According to some embodiments, the campaign management server 101 can extract all campaign messages that were created or sent through the server. Alternatively, the campaign management server 101 can extract all campaign messages in a fixed or preferred timeline, for example, messages sent in the past 30 days. The previous campaign messages 138 can comprise, for example, text message 132 sent to a mobile device, and marketing emails 134 and 136 sent to a computing device.

Network 114 can comprise a single network or a combination of multiple networks, such as the Internet or intranets, wireless cellular networks, local area network (LAN), wide area network (WAN), WiFi, Bluetooth, near-field communication (NFC), etc. Network 114 can comprise a mixture of private and public networks or one or more local area networks (LANs) and wide-area networks (WANs) that may be implemented by various technologies and standards.

According to some embodiments, campaign management server 101 can extract performance metrics and characteristics data of all previously sent campaign messages 138 via executing a management command. According to some embodiments, performance metrics can be related to high click-through rate or high open rate of the campaign messages. In addition, performance metrics can also comprise conversion rate or average revenue generated by the conversion. According to some embodiments, the system can define a threshold for high-performance metrics based on collected data, such as over 30% open rate, or over 2% click-through rate. According to some embodiments, different types of campaigns can be associated with different performance metrics. For example, a promotion campaign's predetermined high-performance metrics could be different from that of a blog/newsletter campaign. According to some embodiments, a weighted and hybrid performance metrics with consideration of various rates and factors, e.g., the conversion rate, the click-through rate, the open rate, the average revenue, can be adopted by the system.

According to some embodiments, campaign management server 101 can remove messages with evident metric errors. An example can be a campaign message that was sent to a small number of recipients since their performance metrics can be skewed due to excessive targeting or statistical randomness.

According to some embodiments, the characteristics comprise, for example, performance metrics, campaign types, campaign attributes, campaign generator attributes, targeting levels, campaign timings, and campaign channels.

According to some embodiments, based on its intended goal, a campaign message can be classified by campaign management server 101 as one of the following types: promotions, featured products, blogs and newsletters, and notifications. For example, promotions and featured products campaigns are created to generate revenue for the marketers, whereas blogs and newsletters campaigns aim to deliver blog/newsletter/entertainment/educational content to its audiences, and notifications campaigns are intended to deliver specific information to the audiences. These listed four types are exemplary and additional or varied message types can be adopted by the system.

According to some embodiments, the campaign type classification 126 can be implemented by a campaign type classifier that can predict any campaign message's category/type based on various data related to the message. Such data can comprise, for example, component content data and layout data, as well as metadata such as the subject line and the campaign name.

A scraper model associated with the campaign type classifier can generate content data and layout date for each component of campaign message 302. For example, the content data can comprise corresponding texts in a component. The content data can further comprise each component's type, e.g., an image component, or a text component. The layout data can describe the render location and appearance of each component, which can be used to infer the message's intent for the classification purpose, e.g., to promote a product, or to announce a news. For example, the layout data can comprise the size, position, color, and visibility of a component relative to the background of a campaign message. According to some embodiments, an extraction model associated with the campaign type classifier can bulk extract objects, such as links and images, from the campaign message.

According to some embodiments, the campaign type classifier can comprise an ensemble model that comprises, for example, conventional logic-rule model(s) and machine learning language model(s), all of which are configured to independently generate a predicted campaign type. According to some embodiments, the ensemble model can comprise, for example, a number of language models configured to independently generate a predicted campaign type. According to some embodiments, the ensemble model can comprise a logic-rule model associated with a plurality of predetermined logic rules. Furthermore, the logic-rule model can comprise a data labeling model to assign weights to the plurality of predetermined logic rules.

According to some embodiments, the campaign type classifier can select a majority campaign type, i.e., the campaign type with the highest votes. According to some embodiments, the campaign type classifier can comprise a data labeling model, e.g., a snorkel model, to weigh and assign importance weight to respective classification models.

Furthermore, when each of the predicted campaign types is different from each other or there is no majority campaign type, the system can select a classification model, e.g., a logic-rule model or a language model, as a default model for generating the campaign type. The selection of the default model can be based on the models' respective success rates of correctly predicting a campaign type. As an alternative, the system can also abstain from predicting a campaign type when the classification confidence is below a threshold that can be empirically predetermined or dynamically adapted.

According to some embodiments, in addition to the campaign type, other characteristic tags 140, such as a marketing-channel tag, a quality-design tag, a holiday tag, can also be determined via a number of respective classification models. Additional tags can be related to, for example, a discount code, an industry type, campaign attributes, campaign generator attributes, targeting levels, campaign timing, etc.

For example, an ensemble classification model can be adopted to determine a design quality, e.g., good-quality design, for a new campaign message. The ensemble classification model can comprise one or more base models configured to independently generate a design quality rating. According to some embodiments, the ensemble classification model can comprise a combination of logic-rule model(s) and language model(s). For example, it can comprise a logic-rule model, a first language model and a second language model, each of which can independently determine a design-quality tag of a campaign message. The ensemble can determine the design quality tag via a majority vote or another selection mechanism.

Similarly, the ensemble classification model can automatically determine a marketing-channel tag or an industry-type tag for any campaign messages. According to some embodiments, as an alternative, a curator can manually review and tag the campaign message with corresponding characteristic tags 140, e.g., good-design, marketing channel, holiday, etc.

In addition to message classification, campaign management server 101 can preprocess the received message data, for example, to filter out non-compliant messages via preprocessing 122. According to some embodiments, the filtering rules are configured to remove non-compliant messages in this stage. A non-compliant message can be geographically specific messages, messages with incorrect performance metrics, messages with missing interest feature values, and messages with performances lower than a predetermined threshold.

For example, to avoid a foreign language or to limit the selection within one country, the filtering rules can remove messages that are not from US companies or from a specific country. The filtering rules can also remove messages with obviously incorrect performance metrics, e.g., too high, or with missing values for features of interest. The filtering rules can further remove messages that do not pass a minimal performance threshold.

Next, the filtered messages are further subjected to bucketing 128 that can segment the campaign messages into campaign peer groups and select respective exemplary campaign messages with performance metrics higher than a predetermined threshold for each campaign peer group. As the campaign messages are divided into different campaign groups, their performance data can be meaningfully compared for selecting the high-performance messages.

According to some embodiments, the segmentation characteristics for grouping the campaign messages can comprise the campaign types, the campaign generator attributes and the targeting levels. Furthermore, the campaign generator attributes can comprise industry types, e.g., apparel & accessories, automotive, electronics, and sizes of the previous campaign generators, e.g., 5-20 employees, or over 100 employees. In addition, other characteristics can be used to divide the messages into different campaign groups.

Furthermore, besides the performance metrics, other factors such as varieties of the industry types, sizes of the campaign generators can also be considered in selecting the campaign messages. This way, any prospective campaign generator can find relevant and engaging showcase messages that share similar traits with the generator. For example, a small company with less than 10 employees in the healthcare industry can view messages that have been proven successful for a similar company in the healthcare industry.

According to some embodiments, campaign management server 101 can adopt a number of parameters to determine the output of the bucketing process. For example, such parameters can define the percentage of kept messages per peer group/bucket, the minimum and/or maximum number of kept emails per peer group. Furthermore, setting the maximum number of kept messages can avoid excessive message volume from the largest peer groups. In addition, the parameters can define the minimum number of kept messages to avoid skipping messages from the smaller peer group. As such, different sized bucket or campaign group can have different parameter rules.

For example, when a campaign segmentation group has less than 10 campaign messages, the system can keep all of them as exemplary messages. When the group has 10-100 campaign messages, the system can keep the top 10 messages with the best performance metrics. When the group has 100-4000 campaign messages, the system can keep the top 10% performance messages. When the group has over 4000 campaign messages, the system can keep the top 400 messages in performance metrics and disregard the rest.

To generate a diversified and balanced campaign message collection, different campaign groups can have different performance thresholds. According to some embodiments, the system can adopt a respective performance threshold for each campaign group. For example, a small campaign group can have a low-performance threshold, whereas a large campaign group can have a high-performance threshold. Furthermore, the threshold values can be empirically predetermined or dynamically adapted. According to some embodiments, the selected exemplary campaign messages are ranked in ascending order according to the performance metrics.

In addition, according to some embodiments, campaign management server 101 can avoid selecting multiple campaign messages from the same campaign generator so that it does not send numerous consent requests to one campaign generator.

According to some embodiments, campaign management server 101 can further filter or remove unsupported campaign messages from the selected exemplary campaign messages via filtering 124. One goal of the filtering process is to reduce the number of messages for further moderation or manual review by a curator. Examples of such unsupported campaign messages can be GIF-based messages, or whether the system can reach the previous campaign generator to obtain the consent to display.

According to some embodiments, campaign management server 101 can enable a manual review and moderation of the remaining selected campaign messages via moderation 130 by a curator. To make the review more efficient, the system can automatically generate a screenshot image of the campaign message. Additional information such as the message's subject line, the preview text, is also available for the curator.

For additional sorting, ranking and management of the messages, the curator can assign a number of tags to the reviewed messages. Examples of such tags can comprise a campaign type, a discount code, a holiday, an industry type, a marketing channel, or a design quality grade. According to some embodiments, instead of a manual review, a moderation model can be trained to review and tag the selected campaign messages. For example, a moderation model that has been trained with messages with discount tags can automatically assign a discount code to a new message. The output of the moderation process can be a list of the selected campaign messages with assigned tags, which can be further saved as JSON (JavaScript Object Notation) data structures in database 113.

According to some embodiments, for each campaign message candidate, the system can initiate a consent process to obtain the previous campaign generator's consent for displaying the message. Upon receiving the consent to display or showcase, the selected and approved exemplary campaign messages in a first order can be sorted and re-organized to generate a sorted list in a second order for optimized presentation and display. According to some embodiments, the first order is chronological order or the order the campaign messages were generated/received by the system. By contrast, the second order is non-chronological order that reflects the preferred diversity and novelty of the campaign messages.

According to some embodiments, via the sorting 144, the system can re-organize the exemplary campaign messages by iteratively dividing and merging the messages. For example, the system can divide, in a number of reiterated and continuous processes, the campaign messages based on a number of characteristic tags 140, in which each division is based on a separate characteristic tag. These divisions can generate a number of sub-groups related to the characteristic tags 140. Next, the system can merge, in a number of iterative steps, the sub-groups to generate one or more sorted exemplary campaign messages based on a number of diversity preference rules 142.

A diversity preference rule can define a preferred ratio or order for merging campaign messages with various tags to ensure the sorted list can render the diversity of the campaign messages. The rendered diversity can be related to the design quality, industry type, holiday-themed, or any characteristics. For example, one diversity preference rule can place best-designed campaign messages before other campaign messages. Another rule can mandate a predetermined ratio, e.g., 1 to 3, between the holiday-tagged message and the non-holiday messages.

According to some embodiments, a campaign generator or user 106 can further apply filters as sorting input to further modify the sorted campaign messages so that the displayed messages 104 are relevant to the user. For example, the system can receive a number of selected characteristic tags, e.g., holiday, industry-type, from the user and generate an updated list of campaign messages by removing one or more campaign messages based on these selected tags.

Figure 2A:
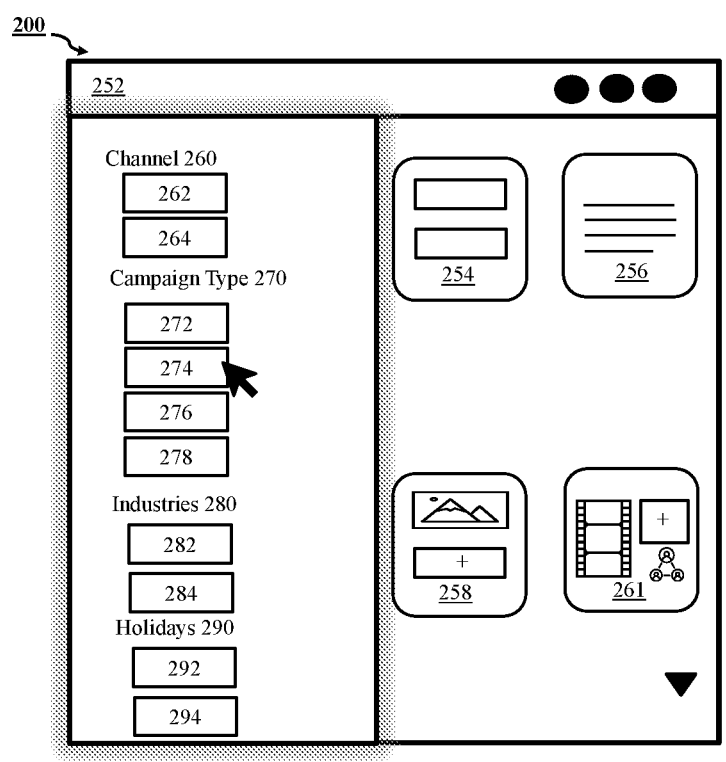
FIG. 2A shows an exemplary display of the exemplary campaign messages to a campaign generator, according to one or more embodiments of the present subject matter.

FIG. 2A shows an exemplary display 200 of the exemplary campaign messages to a campaign generator or a user. A campaign generator can view the exemplary campaign messages via a display 252 of a client device. As shown in FIG. 2A, the campaign generator can provide sorting input to select and view the most relevant showcase campaign messages. For example, various sorting inputs can comprise characteristic tags such as marketing channel 260, campaign type 270, industries 280, holidays 290, as well as other tags such as performance metrics and discounts.

According to some embodiments, marketing channel 260 can comprise an SMS message 262 and an email message 264. Campaign type 270 can comprise a newsletter 272, notifications 274, product announcements 276, and promotions 278. Industries 280 can comprise a number of industry types such as apparel & accessories 282, automotive 284, etc. Furthermore, holidays 290 can comprise a listing of consecutive months, e.g., January 292 and February 294. As an alternative, holidays 290 can comprise a list of specific holidays or foreign holidays e.g., Labor Day, Thanksgiving, Earth Day, Canada Day, etc.

Upon receiving the sorting input, the system can generate relevant and updated exemplary campaign messages and display the updated campaign messages such as email messages 254, 258 and 261, and text message 256 on display 252, in a browsable image grid.

According to some embodiments, the selected and sorted email messages and text messages can be separately stored and maintained. For example, the system can re-sort and update each list every 24 hours. According to some embodiments, the final merging of the two groups can be executed at run time. After receiving the selected characteristic tags, e.g., holiday, industry-type, from the user, the system can first separately update each sorted group, and merge the updated groups to form finalized campaign messages with diversity and relevance.

Figure 2B:
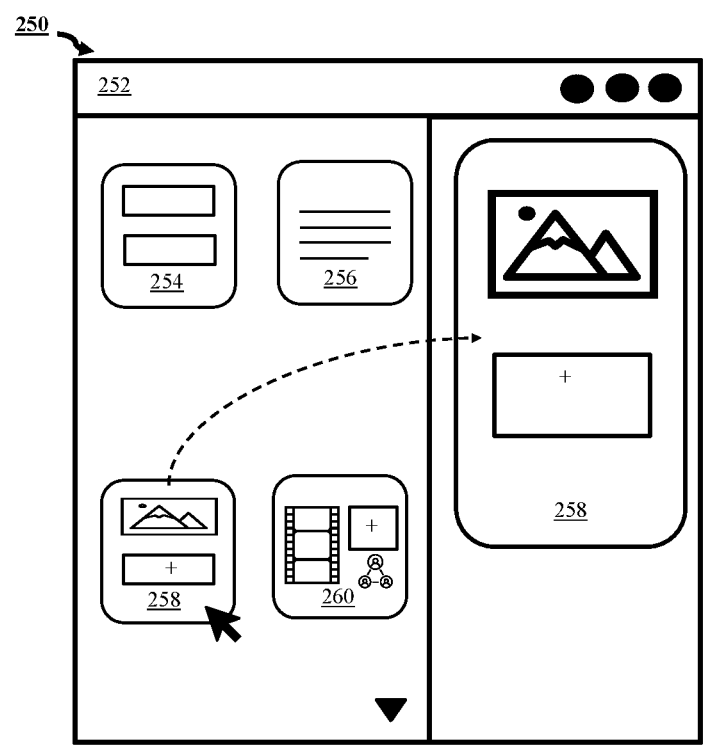
FIG. 2B shows another exemplary display of the exemplary campaign messages to the campaign generator, according to one or more embodiments of the present subject matter.

FIG. 2B shows another exemplary display 250 of the exemplary campaign messages to the campaign generator. A campaign generator can click an email message 258 to initiate a full view. In addition, more characteristic information related to email message 258 can be displayed upon clicking. For example, the system can display the subject line, preview text, and characteristic tags of email message 258.

According to some embodiments, the system can re-sort and update the exemplary campaign messages at a predetermined interval, e.g., every 24 hours, for the same prospective campaign generator. This way, the system can constantly provide fresh inspiration to the campaign generator or user.

Figure 3A:
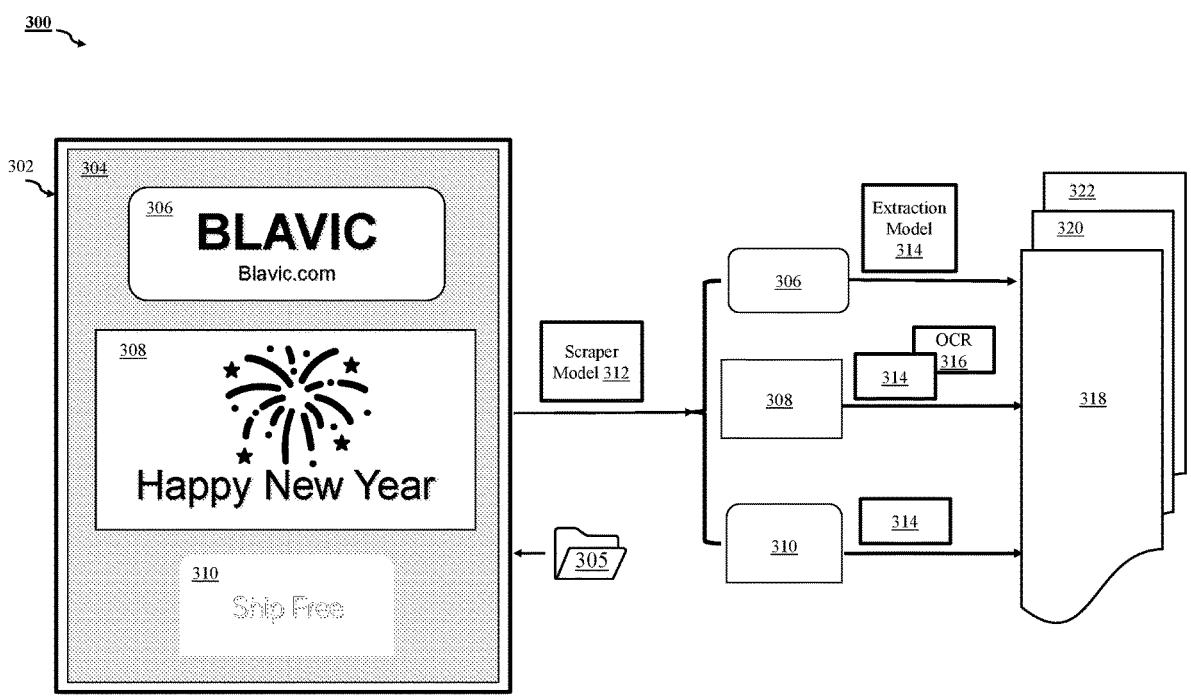
FIG. 3A shows exemplary scraping and preprocessing processes for campaign messages classification, according to one or more embodiments of the present subject matter.

FIG. 3A shows exemplary scraping and preprocessing processes 300 for campaign message classification. As shown in the figure, a campaign message 302 can be a holiday-themed email message received by the campaign message system. Campaign message 302 can comprise various types of message components or blocks, such as link component 306, image component 308 and text component 310. Other types of components such as video component, button component can also be adopted. According to some embodiments, campaign message 302 can comprise metadata 305 such as the subject line, e.g., "Happy New year from Us", and campaign name, e.g., "New Year Promo." Other metadata, such as the message creation time, or campaign generator's information, can also be utilized. According to some embodiments, campaign message 302 can be a mobile text message that can be similarly processed and classified by the system.

A scraper model 312 can be configured to generate content data and layout data for each component of campaign message 302. An example of a scraper model can be a HTML scraper such as BeautifulSoup4. In this example, the content data can comprise corresponding texts, e.g., "Blavic", "Happy New Year", "Ship Free" in each component. The content data can further comprise each component's type, e.g., component 306 includes a hyperlink and component 308 includes an image. The generated layout data can describe the render location and appearance of each component, which can be used to infer the message's intent for the classification purpose. For example, the layout data can comprise the size, position, color, visibility of a component relative to the background 304 of campaign message 302.

According to some embodiments, the system can adopt an extraction model 314 to bulk extract objects, such as links and images, from components 306, 308 and 310. An example of extraction model 314 can be Selenium Webdriver. In addition, to generate the content data, the system can further adopt an OCR (Optical Character Recognition) model 316 to identify and extract texts/letters from image component 308 or other non-editable components.

As shown in FIG. 3A, the scraping and preprocessing processes can generate first content and layout data 318 corresponding to link component 306, second content and layout data 320 corresponding to image component 308, and third content and layout data 322 corresponding to text component 310, which can be further processed in the following classification stage.

Figure 3B:
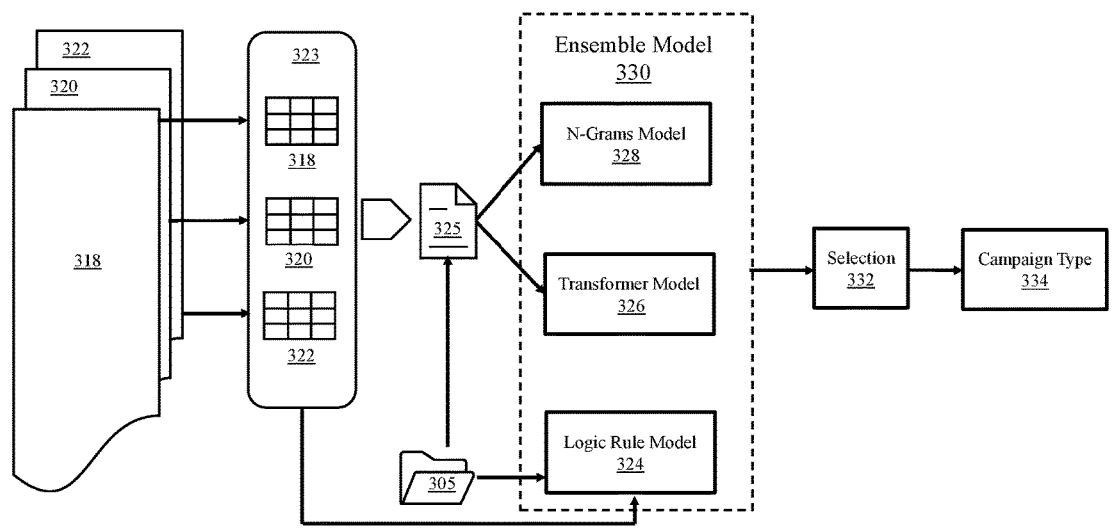
FIG. 3B shows exemplary classification processes following FIG. 3A, according to one or more embodiments of the present subject matter.

FIG. 3B shows exemplary classification processes 350 following FIG. 3A. According to some embodiments, the comprehensive content and layout data 323 of campaign message 302, can comprise first content and layout data 318, second content and layout data 320, and third content and layout data 322.

Pursuant to a list of prediction rules, a logic-rule model 324 can predict a number of campaign types based on the comprehensive content and layout data 323 and metadata 305. A logic-rule model is a non-trainable model based on the list of prediction rules. A prediction rule can define a keyword or regular expression, i.e., content data, associating with a location, i.e., layout data, in accordance with a specific campaign type. For example, a first prediction rule can define that a campaign message has a keyword of "saving" or "save" located anywhere should be classified as a promotion-type message. In addition, a campaign message has a keyword of "discount" located in a text or image component can be categorized as a promotion-type message. Similarly, a campaign message has a keyword of "price drop" located in the subject line and/or the campaign name, i.e., metadata, can be a promotion-type message. For example, a second prediction rule can define that a campaign message has a keyword of "news" or "update" located in the subject line and/or the campaign name can be a notification-type message. In addition, a prediction rule can define the color, size, and visibility of a component in accordance with a predicted campaign type.

According to some embodiments, when the list of prediction rules generates different campaign types for a message, the system can adopt a data labeling model, e.g., snorkel model, to weigh and assign importance weight to respective prediction rules. Furthermore, the data labeling model can be trained with labeled datasets for assigning importance weights to each prediction rule or its result.

Furthermore, the logic-rule model 324 can abstain from making a prediction when classification confidence is below a threshold. Furthermore, the threshold values can be empirically predetermined or dynamically adapted. According to some embodiments, the system can choose the majority campaign type as the output campaign type from logic-rule model 324.

Ensemble modeling can adopt diverse models to predict an outcome by using different modeling algorithms. According to some embodiments, an ensemble model 330 can comprise the logic-rule model 324, transformer model 326 and N-grams model 328, to generate a list of predicted campaign types. A transformer model is a deep learning model that can adopt the mechanism of self-attention for differentially weighting the significance of each part of the input data. Furthermore, a transformer model can comprise an encoder-decoder architecture. An N-gram language model can predict the probability of a given N-gram within any sequence of words in the language. According to some embodiments, additional base models, e.g., a third or fourth language model, can be utilized by the system. The ensemble model 330 can aggregate the prediction of each base model and generate one prediction for the campaign message's type.

As shown in FIG. 3B, metadata 305 and comprehensive content and layout data 323 can be translated into a series of textual representations 325, which can be subject to a feature extraction process by machine learning models such as transformer model 326 and N-grams model 328. The feature extraction process can transform raw textual representations 325 into feature vectors, i.e., numerical features or embeddings representing the original information in the data set.

According to some embodiments, the generated feature vectors can be processed by Support Vector Machine (SVM) models to determine a respective campaign type for each language model. For example, the SVM model can use classification algorithms for two-group classification. After being trained with labeled datasets, the SVM model can classify the text representations 325 into a predicted campaign type.

Upon receiving the list of predicted campaign types, via a selection process 332, the system can select a majority campaign type as the determined campaign type 334. According to some embodiments, the selection process 332 can select the campaign with the highest votes. According to some embodiments, the selection process 332 can comprise a data labeling model, e.g., snorkel model, to weigh and assign importance weight to respective models and campaign types.

According to some embodiments, when each of the predicted campaign types is different from each other or there is no majority campaign type, the system can select a base model, e.g., logic-rule model 324, as a default model for the determined campaign type 334. As an alternative, the system can also abstain from predicting the determined campaign type 334 when the classification confidence is below a threshold, either predetermined or dynamically adjusted.

FIG. 3C shows exemplary content data and layout data 370 in accordance with FIGS. 3A and 3B. As shown in the earlier figures, a scraper model 312 can generate content data and layout date for each component of campaign message 302. For example, first content and layout data 318 can comprise content data such as text "BLAVIC", type "Link," and layout data such as width, height, top, left and visibility. Similarly, second and third content and layout data 320, 322 can comprise content data such as text data "Happy New Year" and corresponding layout data including the position and visibility information.

According to some embodiments, the extracted layout data can describe the render location and appearance of each component, which can be used to infer the intent of the message for the classification. Visibility of a component can be measured by the relative design differences, e.g., color and transparency, between the component and the message background. For example, a large sized text content located in the center with high visibility can be associated with high importance for its intended purpose, e.g., promotion. On the contrary, a small font text or image located close to the bottom can be associated with low priority and assigned with a lower priority for the classification purpose.

Figure 4:
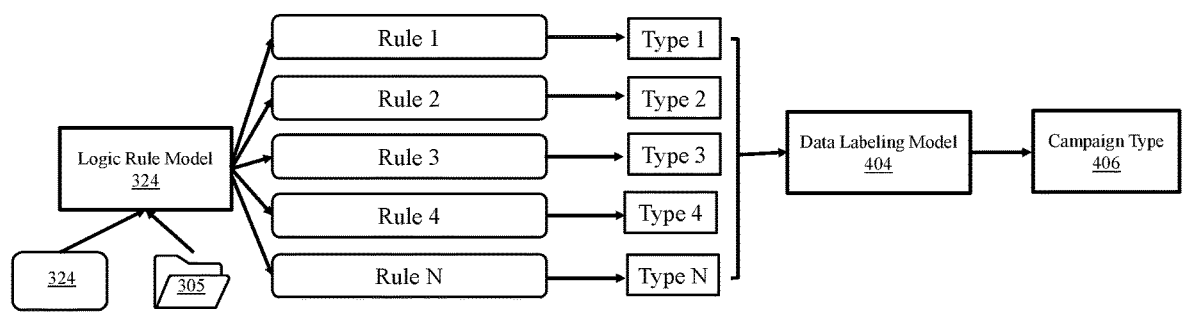
FIG. 4 shows exemplary processes for campaign messages classification using logic-rule model(s), according to one or more embodiments of the present subject matter.

FIG. 4 shows exemplary processes 400 for campaign messages classification using logic-rule model(s) with a number of predetermined prediction rules. According to some embodiments, a prediction rule can define a keyword or regular expression (regex) and/or a location associated with it in accordance with a specific campaign type. For example, a first prediction rule can define that a campaign message has a keyword of "saving" or "save" located anywhere should be classified as a promotion-type message. In addition, a campaign message has a keyword of "discount" located in a text or image component can be categorized as a promotion-type message. Similarly, a campaign message has a keyword of "price drop" located in the subject line and/or the campaign name, i.e., metadata, can be a promotion-type message. For example, a second prediction rule can define that a campaign message has a keyword of "news" or "update" located in the subject line and/or the campaign name can be a notification-type message.

As shown in FIG. 4, pursuant to a list of prediction rules such as rule 1, rule 2 and rule N, a logic-rule model 324 can predict a number of corresponding campaign types based on the comprehensive content and layout data 323 and metadata 305. For example, according to rule 1, logic-rule model 324 can predict type 1 as the campaign type; according to rule 2, the model can predict type 2 as the campaign type, etc. According to some embodiments, the system can choose the majority campaign type as the output campaign type 406 from logic-rule model 324.

According to some embodiments, when the list of prediction rules generates different or conflicting campaign types for a message, the system can adopt a data labeling model, e.g., snorkel model 404, to weigh and assign importance weight to respective prediction rules. As such, the system can opt for a campaign type with the highest aggregated weights. Furthermore, the logic-rule model 324 can abstain from making a prediction when classification confidence is below a threshold.

Figure 5:
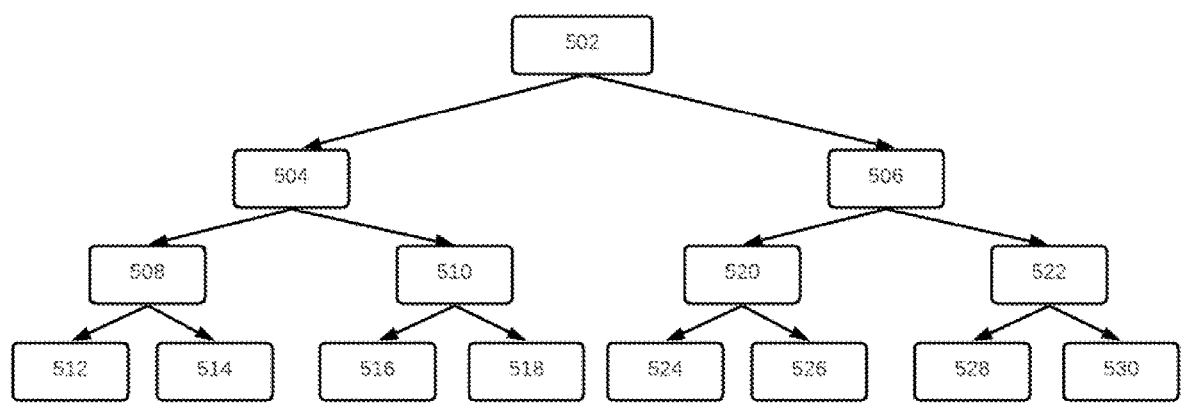
FIG. 5 shows some exemplary processes for campaign message sorting, according to one or more embodiments of the present subject matter.

FIG. 5 shows some exemplary processes 500 for campaign message sorting. According to some embodiments, the system can first divide exemplary campaign messages 502 based on a first characteristic tag, e.g., a marketing channel tag. For example, exemplary campaign messages 502 can be divided into exemplary emails messages 504 and exemplary SMS messages 506 based on the marketing channel tag.

Next, the resulted two message groups, i.e., 504 and 506, can be further respectively divided based on a second characteristic tag, e.g., a design quality tag. For example, exemplary email messages 504 can be divided into best-designed email messages 508 and other emails 510 based on the design-quality tag; exemplary SMS messages 506 can be divided into best designed SMS messages 520 and other SMS messages 522.

Consequently, the resulting sub-groups, i.e., 508, 510, 520 and 522, can be individually divided based on a third characteristic tag, e.g., holiday tag. A campaign message can correspond to an upcoming holiday if its theme is related to a holiday or holiday season within a predetermined amount of time, e.g., 60 days or 75 days, from the calculating day. For example, best-designed email messages 508 can be divided into best-designed holiday email messages 512 and non-holiday best-designed email messages 514. Other emails 510 can be similarly divided into holiday email messages 516 and non-holiday email messages 518. For example, best-designed SMS messages 520 can be divided into best-designed holiday SMS messages 524 and non-holiday best-designed SMS messages 526. Other SMS messages 522 can be divided into holiday SMS messages 528 and non-holiday SMS messages 530. As such, the exemplary campaign messages 502 can be iteratively divided into a plurality of sub-groups, i.e., 512, 514, 516 ... 530, based on the characteristic tags, i.e., marketing channel tag, design-quality tag, and holiday tag.

Figure 6A:
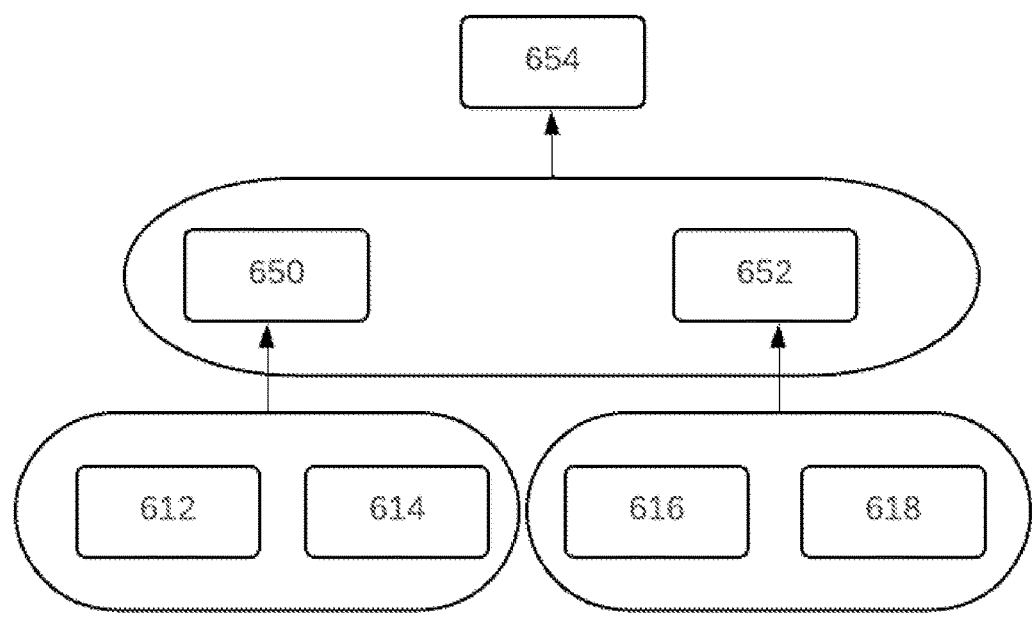
FIG. 6A shows some exemplary processes for campaign message sorting, according to one or more embodiments of the present subject matter.

FIG. 6A shows some exemplary processes 600 for campaign message sorting. According to some embodiments, the sub-groups generated in FIG. 5 can be iteratively merged based on one or more predetermined diversity preference rules. For example, best-designed holiday email messages 612 and non-holiday best-designed email messages 614 can be randomly shuffled and merged based on a predetermined ratio, e.g., 1:3 or one holiday email of every three emails, to generate the best-designed email message group 650. Similarly, holiday email messages 616 and non-holiday email messages 618 can be mixed and merged at a fixed ratio to generate the email message group 652.

Next, the resulting two groups, i.e., 650 and 652, can be merged based on a diversity preference rule that ranks the best-designed email messages over other email messages. As a result, the merging of these two groups can generate a sorted email message group 654. As a result of the diversity-based division/merging process, emails in the sorted email message group 654 can prioritize best-designed messages over other messages. They can also have a balanced ratio between holiday and non-holiday emails.

Figure 6B:
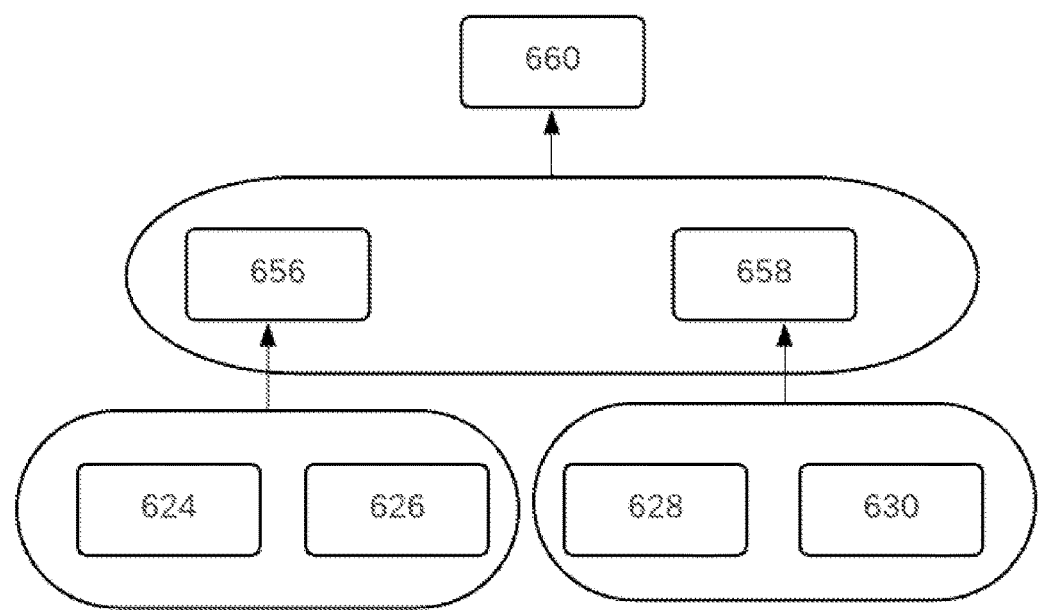
FIG. 6B shows some exemplary processes for campaign message sorting, according to one or more embodiments of the present subject matter.

FIG. 6B shows some exemplary processes 640 for campaign message sorting. For example, best-designed holiday SMS messages 624 and non-holiday best designed SMS messages 626 can be randomly shuffled and merged based on a predetermined ratio, e.g., 1:3 or one holiday SMS of every three SMS, to generate the best-designed SMS message group 656. Similarly, holiday SMS messages 628 and non-holiday SMS messages 630 can be mixed and merged at a fixed ratio to generate the SMS message group 658.

Next, the resulting two groups, i.e., 656 and 658, can be merged based on a diversity preference rule that ranks the best-designed SMS messages over other SMS messages. As a result, the merging of these two groups can generate a sorted SMS message group 660. According to some embodiments, the repeated division and merging processes can be based on other characteristic tags and/or diversity preference rules.

According to some embodiments, the aforementioned sorted email message group 654 and sorted SMS message group 660 can be separately stored and maintained. For example, the system can re-sort and update the sorted email message group 654 and the sorted SMS message group 660 every 24 hours.

According to some embodiments, the final merging of the two groups can be executed at run time. A campaign generator or user can apply filters as sorting input to further modify the sorted campaign messages so that the displayed messages are relevant to his/her unique needs. For example, the system can receive a number of selected characteristic tags, e.g., holiday, industry-type, from the user. After separately updating the sorted email message group 654 and the sorted SMS message group 660 according to the user-specified filters, the system can merge two groups to finalized sorted campaign messages for showing to the user.

According to some embodiments, when the user does not provide any input, the final merging of the two groups can be executed at the request of the user to view the exemplary campaign messages. According to some embodiments, another diversity preference rule, such as a predetermined ratio between the email messages and SMS messages, can be implemented at the final merge.

Figure 7:
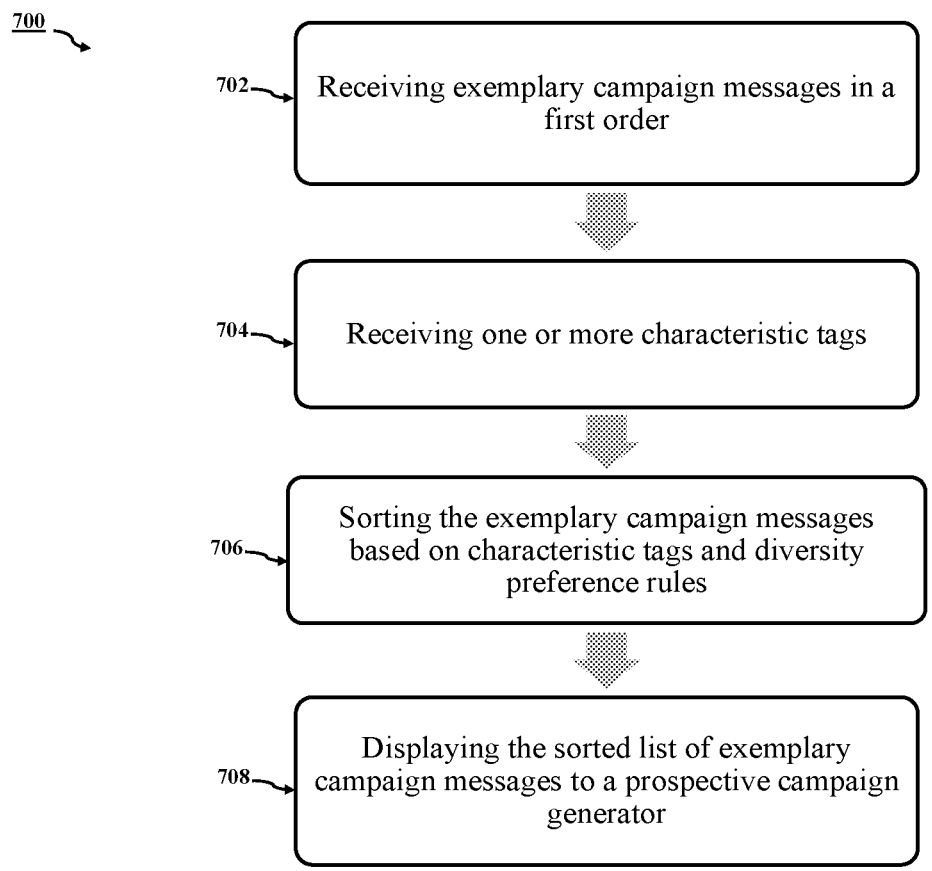
FIG. 7 shows some exemplary processes for campaign messages management, according to one or more embodiments of the present subject matter.

FIG. 7 shows some exemplary processes 700 for campaign message management. At step 702, the campaign message system can receive, at a campaign management server, exemplary campaign messages in a first order or the order the messages were generated/selected. According to some embodiments, the campaign messages can comprise email messages and text messages. According to some embodiments, the campaign messages can comprise one type of campaign message, e.g., email messages, SMS messages, or another form of campaign messages.

At step 704, the system can receive one or more characteristic tags associated with each of the exemplary campaign messages. According to some embodiments, the one or more characteristic tags can be related to the campaign type, marketing-channel, quality-design, holiday, discount code, industry type, campaign attributes, campaign generator attributes, targeting levels, campaign timing, etc. These characteristic tags can either be automatically assigned by classification models or be manually assigned by a curator.

According to some embodiments, for each of the exemplary campaign messages, the system can determine the one or more characteristic tags based on a plurality of message components with content data and layout data using a respective classification model. According to some embodiments, a classification model can be an ensemble model comprising one or more base models such as a logic-rule model, a first language model and a second language model configured to independently generate a characteristic tag.

At step 706, the system can sort the exemplary campaign messages based on the one or more characteristic tags and one or more predetermined diversity preference rules. For example, the system can generate a respective list of sorted exemplary email messages and sorted exemplary text messages in a second order. According to some embodiments, the system can divide, iteratively, the exemplary campaign messages into a plurality of sub-groups based on a number of characteristic tags. For example, these characteristic tags can comprise a marketing channel tag, a quality-design tag and a holiday tag.

According to some embodiments, the system can merge, iteratively, the plurality of sub-groups based on one or more predetermined diversity preference rules. When the campaign messages comprise one type of messages, the resulting list can be the sorted campaign messages. When the campaign messages comprise two or more types of messages, the system can generate two separate lists of sorted email messages and sorted text messages. According to some embodiments, the aforementioned sorted email messages and sorted text messages can be separately stored and maintained. For example, the system can re-sort and update the sorted email messages and the sorted text messages every 24 hours.

According to some embodiments, the final merging of the two groups can be executed at run time. A campaign generator or user can apply filters as sorting input to further modify the sorted campaign messages so that the displayed messages are tailored to his/her unique needs. For example, the system can receive a number of selected characteristic tags, e.g., holiday, industry-type, from the user. After separately updating the sorted email messages and the sorted text messages, the system can merge two groups to finalized sorted campaign messages for displaying to the user.

According to some embodiments, when the campaign generator does not apply any sorting input, the final merging of the two groups can be executed when the user requests to view the exemplary campaign messages. According to some embodiments, another diversity preference rule, such as a predetermined ratio between the email messages and text messages, can be implemented at the final merge.

At step 708, the system can display the sorted exemplary campaign messages in a second order. According to some embodiments, the merged exemplary email messages and text messages can be displayed to the user. According to some embodiments, the sorted exemplary campaign messages can comprise one type of campaign messages, e.g., emails. In addition, the system can frequently shuffle and update the displayed messages for the same user at a predetermined interval, e.g., every 24 hours. As described herein, the exemplary campaign messages are highly diverse, relevant and successful campaign messages that can constantly inspire the user to create high-quality campaign content.

Figure 8:
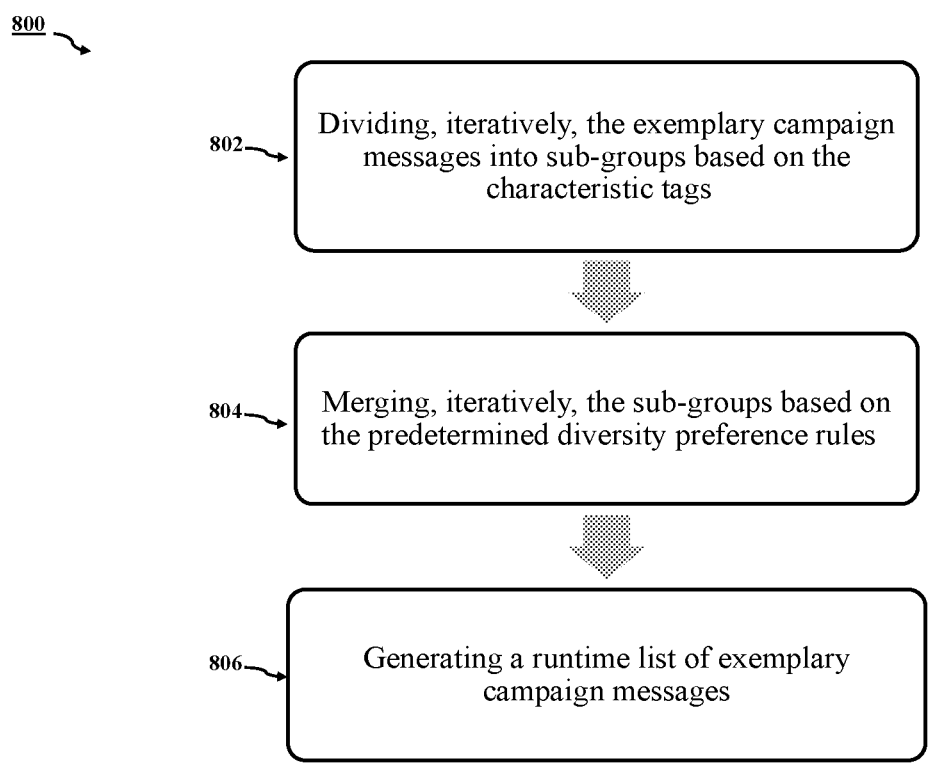
FIG. 8 shows some exemplary processes for campaign messages management, according to one or more embodiments of the present subject matter.

FIG. 8 shows some exemplary processes 800 for campaign messages management. At step 802, the system can divide, iteratively, the exemplary campaign messages into a plurality of sub-groups based on the characteristic tags. For example, the system can divide, in a number of reiterated and continuous processes, the campaign messages based on a number of characteristic tags, in which each division is based on a separate characteristic tag. These divisions can generate a number of sub-groups related to the characteristic tags.

At step 804, the system can merge, iteratively, the plurality of sub-groups based on the one or more predetermined diversity preference rules to generate a sorted list of the exemplary campaign messages that can be constantly updated, e.g., every 24 hours. A diversity preference rule can define a preferred ratio or order for merging campaign messages with various tags to ensure the sorted list can render the diversity of the campaign messages. The rendered diversity can be related to the design quality, industry type, holiday-themed, or any characteristics. For example, one diversity preference rule can prioritize best-designed campaign messages before other campaign messages. Another rule can mandate a predetermined ratio, e.g., 1 to 3, between the holiday-tagged message and the non-holiday messages. Furthermore, when there is more than one type of campaign messages, each type of message can maintain and update a separate sorted list of messages.

At step 806, upon the user's request, the system can generate a runtime list of exemplary campaign messages with or without the user's sorting input. According to some embodiments, a campaign generator or user can further apply filters as sorting input to further modify the sorted campaign messages so that the displayed messages are tailored to his/her unique needs. For example, the system can receive a number of selected characteristic tags, e.g., holiday, industry-type, from the user and generate an updated list of campaign messages by removing one or more campaign messages based on these selected tags.

As such, the system can dynamically select and showcase high-performance campaign messages with consideration for the messages' relevance, diversity, and breath. These showcase exemplary messages can represent a broad range of successful marketing campaigns, which can be used to inspire and teach other campaigns that share similar traits and preferences with the previous campaigns.

As disclosed in the present subject matter, the campaign message system can continuously extract performance metrics and data of all previously sent campaign messages. The system can preprocess the received message data, for example, to filter out non-compliant messages. The resulting messages are further subjected to a bucketing process that can segment the campaign messages into campaign peer groups and select respective campaign messages with performance metrics higher than a predetermined threshold. As the campaign messages are divided into different campaign groups, their performance data can be meaningfully compared for selecting the high-performance messages. Furthermore, to generate a diverse campaign message collection suitable for different campaign generators, the system can adopt a respective performance threshold for each respective campaign group.

Next, the system can remove unsupported campaign messages from the automatically generated campaign messages and, if needed, enable a manual review and moderation of the remaining messages. During the moderation process, a curator can remove inappropriate messages or poor design-quality messages. Furthermore, for each approved message, the curator can assign multiple tags, such as a campaign type, a discount code, a holiday, an industry type, a marketing channel, or a design quality grade, to facilitate the management and post-processing of the selected messages. According to some embodiments, instead of or in addition to a manual review, a moderation model can be trained to review and tag the selected campaign messages. For example, a moderation model that has been trained with messages with discount tags can automatically assign a discount code to a new message.

Furthermore, the system can initiate a consent process to obtain the previous campaign generator's consent. Upon receiving the consent to display or showcase, the selected and approved campaign messages can be displayed to a prospective campaign generator for creative inspiration.

During this process, the system can adopt a campaign type classifier to predicate any campaign message's category based on various data related to the message. Such data can comprise content components with layout data as well as metadata such as the subject line and the campaign name. The campaign type classifier can be an ensemble model that comprises at least a logic-rule model, a first language model, and a second language model configured to independently generate a predicted campaign type.

In addition, the system can rank, organize and present the selected campaign messages to showcase diversified campaign examples that have delivered excellent outcomes and matched the user's expressed interest or preference. Such sorting and displaying can be based on the assigned tags such as a campaign type, a discount code, a holiday tag, an industry tag, a quality-design tag, and a marketing channel tag. In particular, the system can selectively divide, merge and rank the campaign messages based on the assigned tags as well as other characteristic data of the messages.

Furthermore, the system can dynamically update and refresh the displayed campaign messages to the same user or marketer. For example, the prospective marketer can view different campaign messages every 24 hours, or at a specific interval predetermined by the system.

As such, the system can generate an expansive and growing list of relevant, diverse, and high-performing campaign messages to inspire a campaign generator to create engaging content of his/her own.

Figure 9A:
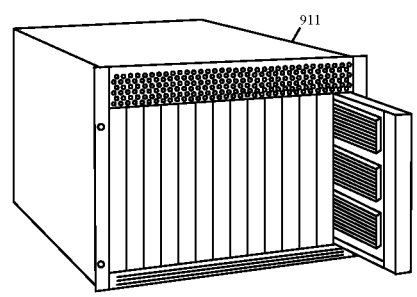
FIG. 9A shows a server system of rack-mounted blades, according to one or more embodiments of the present subject matter.

FIG. 9A shows a server system of rack-mounted blades for implementing the present subject matter. Various examples are implemented with cloud servers, such as ones implemented by data centers with rack-mounted server blades. FIG. 9A shows a rack-mounted server blade multi-processor server system 911. Server system 911 comprises a multiplicity of network-connected computer processors that run software in parallel.

Figure 9B:
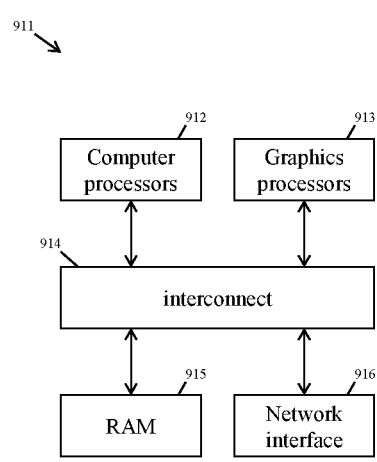
FIG. 9B shows a diagram of a networked data center server, according to one or more embodiments of the present subject matter.

FIG. 9B shows a diagram of a server system 911. It comprises a multicore cluster of computer processors (CPU) 912 and a multicore cluster of graphics processors (GPU) 913. The processors connect through a board-level interconnect 914 to random-access memory (RAM) devices 915 for program code and data storage. Server system 911 also comprises a network interface 916 to allow the processors to access the Internet, non-volatile storage, and input/output interfaces. By executing instructions stored in RAM devices 915, the CPUs 912 and GPUs 913 perform steps of methods described herein.

Figure 10A:
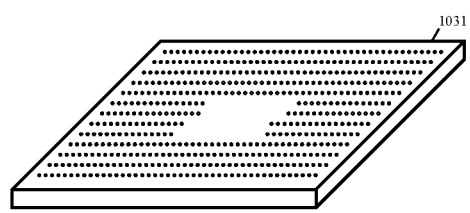
FIG. 10A shows a packaged system-on-chip device, according to one or more embodiments of the present subject matter.

FIG. 10A shows the bottom side of a packaged system-on-chip device 1031 with a ball grid array for surface-mount soldering to a printed circuit board. Various package shapes and sizes are possible for various chip implementations. System-on-chip (SoC) devices control many embedded systems, IoT device, mobile, portable, and wireless implementations.

Figure 10B:
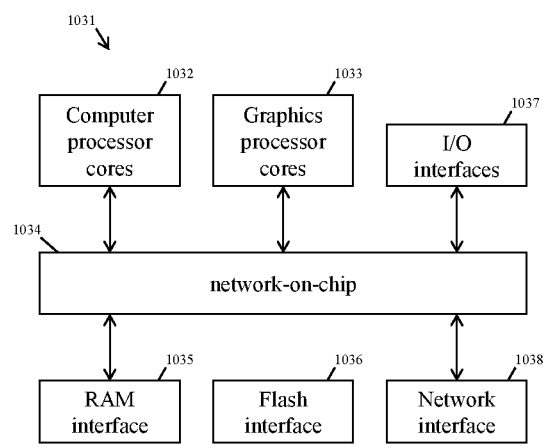
FIG. 10B shows a block diagram of a system-on-chip, according to one or more embodiments of the present subject matter.

FIG. 10B shows a block diagram of the system-on-chip 1031. It comprises a multicore cluster of computer processor (CPU) cores 1032 and a multicore cluster of graphics processor (GPU) cores 1033. The processors connect through a network-on-chip 1034 to an off-chip dynamic random access memory (DRAM) interface 1035 for volatile program and data storage and a Flash interface 1036 for non-volatile storage of computer program code in a Flash RAM non-transitory computer readable medium. SoC 1031 also has a display interface for displaying a graphical user interface (GUI) and an I/O interface module 1037 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 1031 also comprises a network interface 1038 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 1035 or Flash devices through interface 1036, the CPU cores 1032 and GPU cores 1033 perform functionality as described herein.

Examples shown and described use certain spoken languages. Various embodiments work, similarly, for other languages or combinations of languages. Examples shown and described use certain domains of knowledge and capabilities. Various systems work similarly for other domains or combinations of domains.

Some systems are screenless, such as an earpiece, which has no display screen. Some systems are stationary, such as a vending machine. Some systems are mobile, such as an automobile. Some systems are portable, such as a mobile phone. Some systems are for implanting in a human body. Some systems comprise manual interfaces such as keyboards or touchscreens.

Some systems function by running software on general-purpose programmable processors (CPUs) such as ones with ARM or x86 architectures. Some power-sensitive systems and some systems that require especially high performance, such as ones for neural network algorithms, use hardware optimizations. Some systems use dedicated hardware blocks burned into field-programmable gate arrays (FPGAs). Some systems use arrays of graphics processing units (GPUs). Some systems use application-specific-integrated circuits (ASICs) with customized logic to give higher performance.

Some physical machines described and claimed herein are programmable in many variables, combinations of which provide essentially an infinite variety of operating behaviors. Some systems herein are configured by software tools that offer many parameters, combinations of which support essentially an infinite variety of machine embodiments.

Several aspects of implementations and their applications are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method for electronic message management, the method comprising:

receiving, at a campaign management server, exemplary campaign messages, wherein the exemplary campaign messages comprise email messages and text messages in a first order;

generating layout data by extracting size, location, and visibility data of image or text components of the exemplary campaign messages;

extracting performance metrics for each of the exemplary campaign messages;

predicting, via an ensemble classification model, a characteristic tag associated with each of the exemplary campaign messages at least partially based on the generated layout data, and wherein the ensemble classification model comprises a logic-rule model, a first language model, and a second language model configured to independently predict a candidate characteristic tag for each of the exemplary campaign messages, and wherein the ensemble classification model is configured to determine the characteristic tag based on the independently predicted candidate characteristics tags;

assigning one or more predetermined diversity preference rules associated with the exemplary campaign messages;

sorting the exemplary campaign messages based on the characteristic tags, and a combination of the performance metrics and the one or more predetermined diversity preference rules to generate a respective list of sorted exemplary email messages and sorted exemplary text messages in a second order; and displaying the respective list of exemplary email messages and exemplary text messages to a prospective campaign generator based on the respective list of sorted exemplary email messages and sorted exemplary text messages.

2. The computer-implemented method of claim 1, further comprises:
 receiving one or more selected characteristic tags;
 removing one or more exemplary campaign messages based on the one or more selected characteristic tags to generate a respective updated list of email messages and text messages; and
 merging the respective updated list of email messages and text messages to form a runtime list of sorted exemplary email messages and sorted exemplary text messages.

3. The computer-implemented method of claim 1, wherein sorting the exemplary campaign messages further comprises:
 dividing, iteratively, the exemplary campaign messages into a plurality of sub groups based on at least one of the characteristic tags; and
 merging, iteratively, the plurality of sub-groups based on the one or more predetermined diversity preference rules to generate the respective list of sorted email messages and sorted text messages.

4. The computer-implemented method of claim 1, further comprises:
 assigning, by a reviewer, the one or more characteristic tags to each of the exemplary campaign messages.

5. The computer-implemented method of claim 1, further comprising:
 assigning a holiday tag to one or more of the exemplary campaign messages, wherein the holiday tag is dynamically updated based on a time for the sorting of the exemplary campaign messages.

6. A computer-implemented method for electronic message management, the method comprising:
 receiving, at a campaign management server, exemplary campaign messages in a first order;
 generating layout data by extracting size, location, and visibility data of image or text components of the exemplary campaign messages;
 extracting performance metrics for each of the exemplary campaign messages;
 predicting, via an ensemble classification model, a characteristic tag associated with each of the exemplary campaign messages at least partially based on the generated layout data, and wherein the ensemble classification model comprises a logic-rule model, a first language model, and a second language model configured to independently predict a candidate characteristic tag for each of the exemplary campaign messages, and wherein the ensemble classification model is configured to determine the characteristic tag based on the independently predicted candidate characteristics tags;
 assigning one or more predetermined diversity preference rules associated with the exemplary campaign messages;
 sorting the exemplary campaign messages based on the one or more characteristic tags, and the performance metrics and the one or more predetermined diversity preference rules to generate a list of sorted exemplary campaign messages in a second order; and
 displaying the list of sorted exemplary campaign messages to a prospective campaign generator.

7. The computer-implemented method of claim 6, wherein the exemplary campaign messages comprise email messages and text messages, and wherein the list of sorted exemplary messages comprises a respective list of sorted exemplary email messages and sorted exemplary text messages.

8. The computer-implemented method of claim 6, wherein the one or more characteristic tags comprise at least one of a marketing channel tag, a quality-design tag, a holiday tag, a campaign type tag, a discount code tag and an industry type tag.

9. The computer-implemented method of claim 6, further comprises:
 receiving one or more selected characteristic tags from a prospective campaign generator;
 removing one or more exemplary campaign messages based on the one or more selected characteristic tags to generate an updated list of sorted exemplary messages; and
 displaying the updated list of sorted exemplary messages to the prospective campaign generator.

10. The computer-implemented method of claim 6, further comprising:
 re-sorting, at a predetermined interval, the exemplary campaign messages based on the one or more characteristic tags and the one or more predetermined diversity preference rules to generate an updated list of sorted exemplary campaign messages.

11. A system for electronic message management comprising:
 memory storing instructions that are executable; and
 one or more processing devices to execute the instructions to perform operations comprising:
  receiving, at a campaign management server, exemplary email messages in a first order;
  generating layout data by extracting size, location, and visibility data of image or text components of the exemplary email messages;
  extracting performance metrics for each of the exemplary email messages;
  predicting, via an ensemble classification model, a characteristic tag associated with each of the exemplary email messages at least partially based on the generated layout data, and wherein the ensemble classification model comprises a logic-rule model, a first language model, and a second language model configured to independently predict a candidate characteristic tag for each of the exemplary email messages, and wherein the ensemble classification model is configured to determine the characteristic tag based on the independently predicted candidate characteristics tags;
  assigning one or more predetermined diversity preference rules associated with the exemplary email messages;
  sorting the exemplary email messages based on the one or more characteristic tags, and a combination of the performance metrics and the one or more predetermined diversity preference rules to generate a list of sorted exemplary email messages in a second order; and
  displaying the list of sorted exemplary email messages to a prospective campaign generator.

12. The system of claim 11, wherein the operations further comprise:
 re-sorting, at a predetermined interval, the exemplary email messages based on the one or more characteristic tags and the one or more predetermined diversity preference rules to generate an updated list of sorted exemplary email messages.

13. The system of claim 11, wherein the ensemble classification model is configured to sum identical candidate characteristic tags to identify a majority score for each exemplary email message, and wherein the predicted characteristic tag for each exemplary email message is the candidate characteristic tag receiving the majority score.

14. The system of claim 13, wherein the operations further comprise selecting a default base model for determining the predicted characteristic tag when a majority score cannot be computed, and wherein the selecting is based on which base model is most successful at predicting a characteristic tag.

15. The system of claim 11, wherein the operations further comprise: filtering the list of sorted messages based on a user-selected characteristic tag, and wherein the user-selected characteristic tag is industry type or organization size.

16. The system of claim 11, wherein the predetermined diversity preference rule is a ratio of the number of messages associated a first characteristic tag to the number of messages associated with a second characteristic tag.

17. The method of claim 1, wherein logic-rule model is non-trainable and comprises a plurality of prediction rules.

18. The method of claim 17, further comprising implementing a trained data labeling model to weigh and assign weight to each of the prediction rules when the logic rule model generates different campaign types for one message.

* * * * *